(12) United States Patent
Borgese et al.

(10) Patent No.: US 11,560,932 B2
(45) Date of Patent: Jan. 24, 2023

(54) DAMPING DEVICE FOR A SUSPENSION OF A BICYCLE

(71) Applicant: HIRIDE SUSPENSION S.R.L., Milan (IT)

(72) Inventors: Domenico Borgese, Milan (IT); Fabio Noce, Luisago (IT)

(73) Assignee: HIRIDE SUSPENSION S.R.L., Milan (IT)

( * ) Notice: Subject to any disclaimer, the term of this patent is extended or adjusted under 35 U.S.C. 154(b) by 122 days.

(21) Appl. No.: 17/053,375

(22) PCT Filed: Apr. 18, 2019

(86) PCT No.: PCT/IB2019/053236
§ 371 (c)(1),
(2) Date: Nov. 6, 2020

(87) PCT Pub. No.: WO2019/251525
PCT Pub. Date: Nov. 14, 2019

(65) Prior Publication Data
US 2021/0156447 A1    May 27, 2021

(30) Foreign Application Priority Data
May 7, 2018  (IT) .................. 102018000005099

(51) Int. Cl.
*F16F 9/18* (2006.01)
*F16F 9/516* (2006.01)
(Continued)

(52) U.S. Cl.
CPC ............. *F16F 9/185* (2013.01); *B62K 25/08* (2013.01); *F16F 9/182* (2013.01); *F16F 9/516* (2013.01); *B62K 2025/044* (2013.01)

(58) Field of Classification Search
CPC ............ F16F 9/185; F16F 9/182; F16F 9/516; F16F 9/467; F16F 9/348; F16F 9/462; B62K 25/08; B62K 2025/044
(Continued)

(56) References Cited

U.S. PATENT DOCUMENTS 5,848,675 A * 12/1998 Gonzalez .................. F16F 9/06
188/322.22
7,878,310 B2 * 2/2011 McAndrews ........... F16F 9/504
188/319.1
(Continued)

FOREIGN PATENT DOCUMENTS

JP    H06234386 A    8/1994
WO   2017169152 A1  10/2017

OTHER PUBLICATIONS

International Search Report and Written Opinion in PCT/IB2019/053236 dated Jul. 11, 2019.

*Primary Examiner* — Robert A. Siconolfi
*Assistant Examiner* — James K Hsiao
(74) *Attorney, Agent, or Firm* — Manelli Selter PLLC; Edward Stemberger (57) ABSTRACT

A damping device (1) for a suspension (100) of a bicycle includes:
  a first tubular body (2) defining a first chamber (4);
  a second tubular body (3) defining a second chamber (5) fluidically communicating with the first chamber (4);
  a third tubular body (8) disposed inside the second chamber (5), the interior thereof defining a third chamber (9) fluidically communicating with the second chamber (5);
  a hollow stem (10) integral with the first tubular body (2), defining a through cavity (11) which establishes a fluid communication between the third chamber (9) and the first chamber (4);

(Continued)

a first static valve (12) disposed between the second chamber (5) and the third chamber (9);

a second static valve (14), connected to the stem (10), operatively disposed between the third chamber (9) and the cavity (11) of the stem (10);

a dynamic valve (15) connected to the first tubular body (2) inside the first chamber (4), operatively disposed between the cavity (11) of the stem (10) and the first chamber (4).

8 Claims, 5 Drawing Sheets (51) Int. Cl.
*B62K 25/08* (2006.01)
*B62K 25/04* (2006.01)

(58) Field of Classification Search
USPC .......................................................... 188/314
See application file for complete search history.

(56) References Cited

U.S. PATENT DOCUMENTS

| | | | | |
|---|---|---|---|---|
| 8,251,376 B2* | 8/2012 | Mouri | ..................... | F16F 9/56 280/5.515 |
| 8,499,905 B2* | 8/2013 | Uchiyama | .............. | B62K 25/08 188/322.19 |
| 8,596,663 B2* | 12/2013 | Shirai | ..................... | F16F 9/462 280/276 |
| 8,641,052 B2* | 2/2014 | Kondo | ................... | B60G 13/14 188/266.2 |
| 8,813,922 B2* | 8/2014 | Mochizuki | .............. | F16F 9/466 188/313 |
| 8,857,580 B2* | 10/2014 | Marking | ................... | F16F 9/19 188/266.2 |
| 9,273,745 B2* | 3/2016 | Mochizuki | .............. | F16F 9/461 |
| 9,481,425 B2* | 11/2016 | Shirai | ..................... | B62K 25/08 |
| 10,093,384 B2* | 10/2018 | Shimasaki | .............. | F16F 9/165 |
| 2004/0150143 A1* | 8/2004 | Zimmer | ................. | F16F 9/0209 267/64.11 |
| 2008/0230335 A1* | 9/2008 | Furuya | .................... | F16F 9/067 188/315 |
| 2009/0255768 A1* | 10/2009 | Inoue | ........................ | F16F 9/56 188/313 |
| 2009/0261555 A1* | 10/2009 | Tomiuga | .................... | F16F 9/20 280/279 |
| 2010/0294606 A1* | 11/2010 | Nagai | ..................... | F16F 9/185 188/314 |
| 2011/0012317 A1* | 1/2011 | Mouri | ....................... | F16F 9/56 280/5.519 |
| 2011/0084464 A1* | 4/2011 | Inoue | ..................... | B62K 25/08 280/276 |
| 2012/0049427 A1* | 3/2012 | Hsu | ......................... | F16F 9/063 188/313 |
| 2012/0247893 A1* | 10/2012 | Gonzalez | .............. | F16F 9/3242 188/297 |
| 2013/0134688 A1* | 5/2013 | Mochizuki | .............. | F16F 9/464 188/313 |
| 2014/0124314 A1* | 5/2014 | Mochizuki | .............. | B62K 25/08 188/322.13 |
| 2014/0182984 A1* | 7/2014 | Ito | ............................. | F16F 9/26 188/297 |
| 2014/0339034 A1* | 11/2014 | Mochizuki | .............. | F16F 9/187 188/315 |
| 2015/0096852 A1* | 4/2015 | Yoshida | .................... | F16F 9/22 188/297 |
| 2016/0185176 A1* | 6/2016 | Tsukahara | ............... | F16F 9/465 188/315 |
| 2018/0001953 A1* | 1/2018 | Winefordner | .............. | B62J 1/08 |

* cited by examiner

DAMPING DEVICE FOR A SUSPENSION OF A BICYCLE

TECHNICAL FIELD OF THE INVENTION

It is an object of the present invention a damping device for a suspension of a bicycle, particularly a front suspension of a bicycle, such as a mountain bike.

PRIOR ART

A suspension of which it is possible to adjust the damping action of the suspension itself, particularly the damper thereof, is known. Particularly, a suspension of which the damping action is adjusted by a solenoid valve impacting the recirculation of the oil on the suspension itself is known. The solenoid valves are magnetic induction devices, wherein a solenoid, in which a current flows, moves a ferrous mechanical element, which in turn determines the longitudinal displacement of an axial element which causes the opening, closure, or partial opening/closure of an oil passage opening. This chocking action modifies the damping action performed by the suspension.

However, the solenoid valves are devices which are not adapted to be mounted to bicycle suspensions, particularly due to the size thereof, which affect the overall size of the suspension itself.

SUMMARY OF THE INVENTION

Therefore, an object of the present invention consists of making available a damping device for bicycles which represents an alternative to the prior art devices, wherein it is possible to modify the damping action without using solenoid-type valves, consequently it is possible to reduce the size of a suspension provided with the damping device.

This and other objects are obtained by a damping device for a bicycle suspension according to claim 1.

BRIEF DESCRIPTION OF THE FIGURES

In order to better understand the invention and appreciate the advantages, some exemplifying non-limiting embodiments thereof will be described in the following with reference to the attached figures, wherein:

FIG. 5b is a perspective view of a detail of the static valve of FIG. 5a;

DETAILED DESCRIPTION OF THE INVENTION

In the present description, it is made reference only in an exemplifying way to a front suspension of a mountain bike of the "up-side-down" fork type. However, the present invention can also find an application in suspensions of a different type, for example in standard forks, in other words not of the "up-side-down" type, as will be evident to a person skilled in the field.

Figure 1:
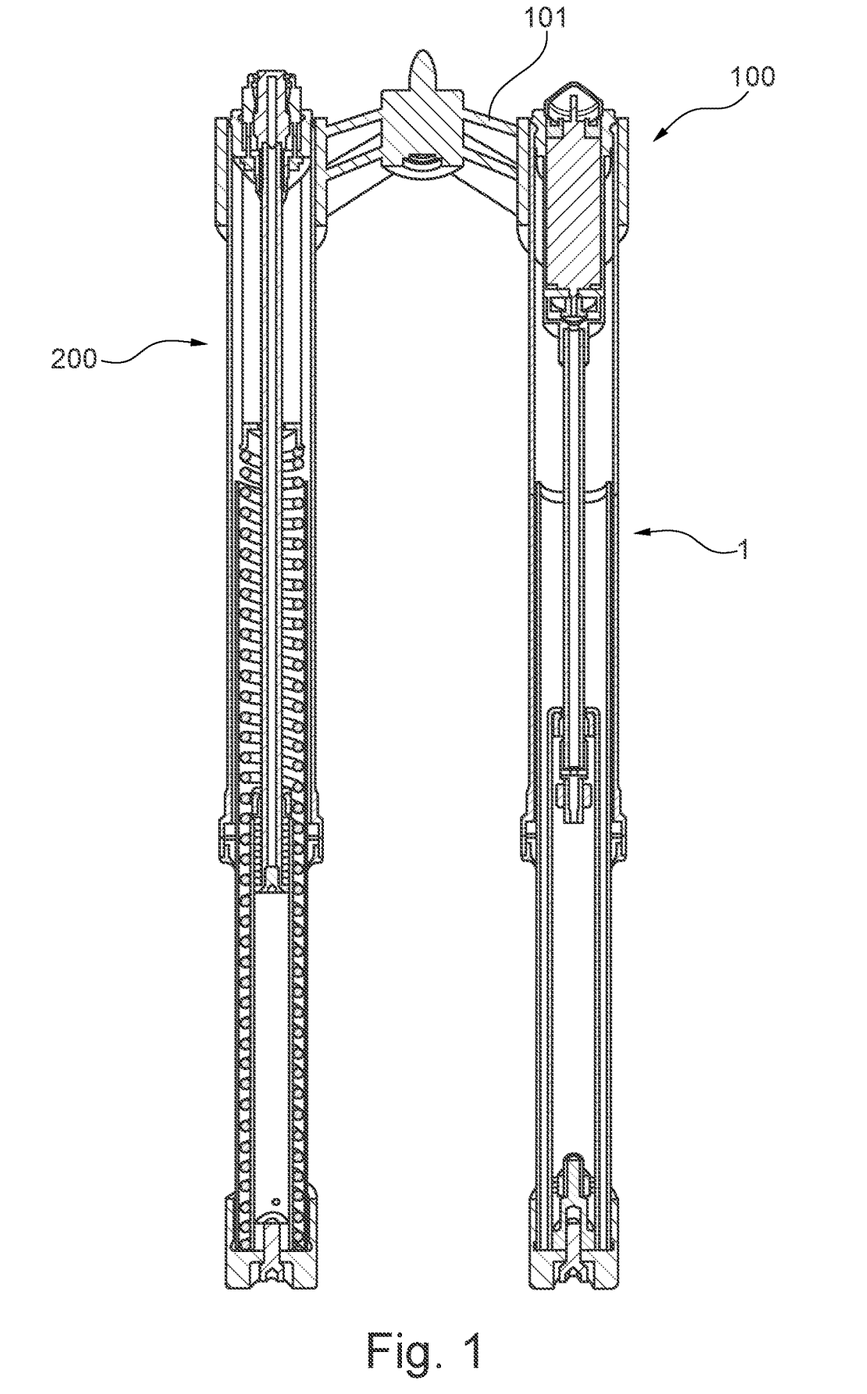
FIG. 1 is a longitudinal cross-section view of a suspension provided with a damping device according to an embodiment of the invention.

With reference to the attached FIG. 1, a bicycle suspension is indicated by reference 100. The suspension 100, according to what was hereinbefore discussed, can be for example a front suspension of a mountain bike of the up-side-down fork type.

The suspension 100 comprises an elastic device 200 and a damping device 1. The elastic device 200 substantially elastically performs the function of damping and storing the energy transferred from the ground to the bicycle wheel, while the damping device 1 has the function of partially dissipating such energy. According to an exemplifying embodiment of FIG. 1, the damping device 1 and the elastic device 200 are separated from each other and implement two distinct stems of the suspension 100 itself. According to further possible not illustrated variants, such devices can alternatively be joined in order to form a single device. In the embodiment illustrated in FIG. 1, the elastic device 200 and damping device 1 are joined to each other by a central element 101 of the suspension 100, which in turn can be connected to the steering of the bicycle, for example. At the opposite sides with respect to the central element 101, the elastic device 200 and damping device 1 can be connected to a hub of a bicycle wheel, so that they operatively act in parallel on this latter.

Figures 2, 3:
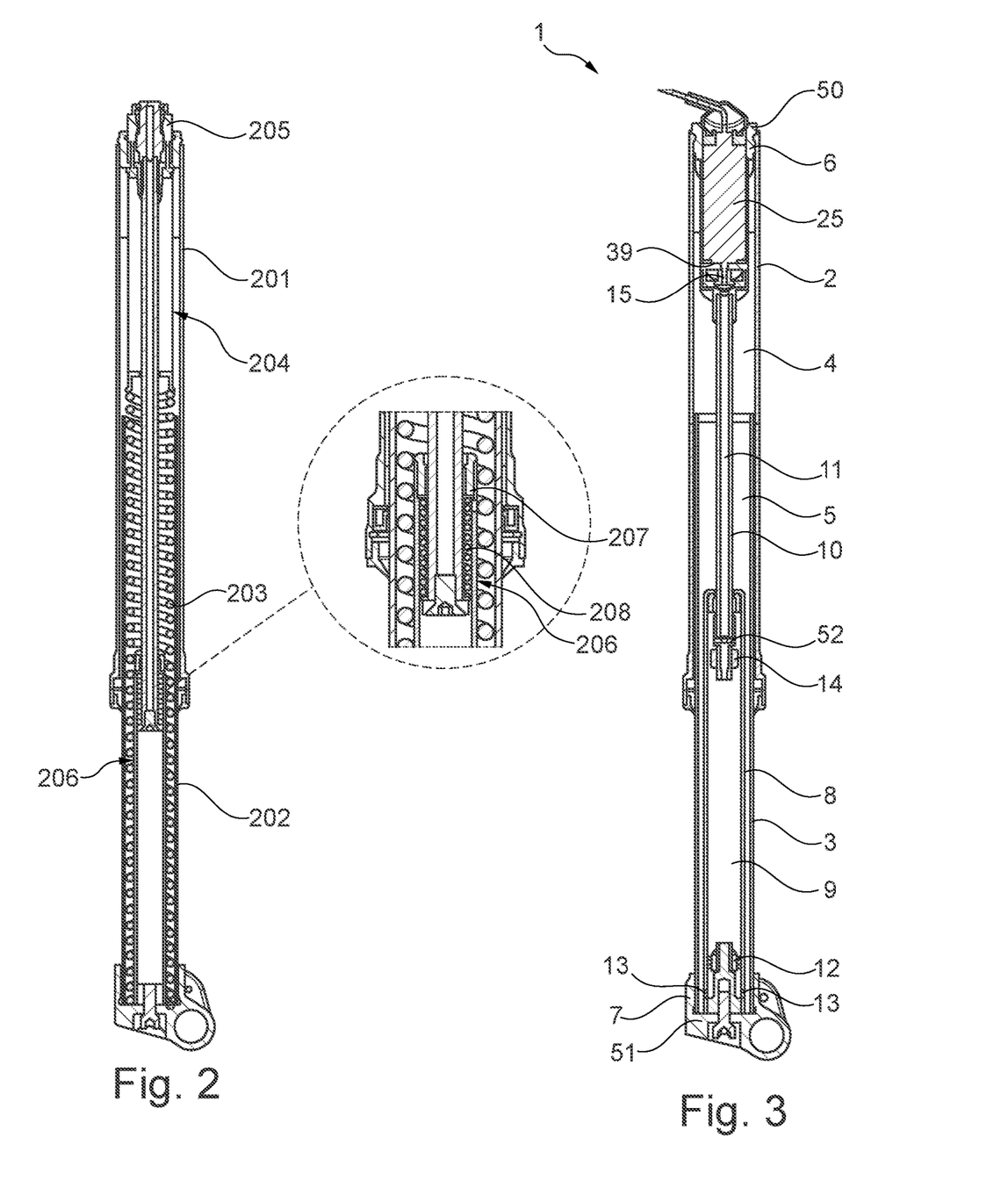
FIG. 2 is a longitudinal cross-section view of an elastic device of the suspension in FIG. 1.
FIG. 3 is a longitudinal cross-section view of a damping device according to an embodiment of the invention.

Referring now to FIG. 2, generally the elastic device 200 comprises an external tubular body 201 and an internal tubular body 202 axially sliding with respect to the external tubular body. For example, the external tubular body 201 can be integrally connected to the beforehand cited central element 101 of the suspension, while the internal tubular body 202 can be connected to the hub of the bicycle wheel, or vice versa. Elastic means, such as for example a coil spring 203, operate between the external tubular 201 and internal bodies 202, the relative motions thereof are caused by vertical motions of the bicycle wheel caused by the ground roughness. According to a possible embodiment, the elastic device 200 comprises a spacer 204 integral with the external tubular body 201 for example, and the coil spring 203 can operate between the spacer 204 itself and the bottom of the internal tubular body 202. Advantageously, the spacer 204 can be axially moved inside the external tubular body 201, for example by acting on a ferrule 205 screwable in this latter, in order to modify the preload of the spring 203. Further, means 206 preventing the relative unthreading of the internal tubular body 202 from the external tubular body 201 are provided. The unthreading means 206 comprise, for example, an unscrewing pad 207 and an auxiliary spring for the stop abutment 207.

Referring now to FIG. 3, the damping device 1 comprises a first tubular body 2 and second tubular body 3 axially sliding with respect to the first tubular body 2. For example, according to what is shown in FIG. 3, the second tubular body 3 can slide inside the first tubular body 2, however, as an alternative, the opposite arrangement could be provided. The first tubular body 2 is adapted to be integrally connected to the bicycle frame, particularly to the steering thereof, for example by the beforehand cited central element 101 of the suspension, while the second tubular body 3 is destined to be connected to the bicycle wheel, for example to the hub thereof.

The interior of the first tubular body 2 defines a first chamber 4, and the interior of the second tubular 3 defines a second chamber 5. The first chamber 4 and the second chamber 5 are preferably a continuation of each other, in other words are not distinct and separated from each other, but as a whole they form a single chamber. For example, according to the embodiment shown in FIG. 3, the second tubular body 3 slides inside the first chamber 4 of the first tubular body 2. Preferably, the first tubular body 2 is closed at a free end 50 thereof (in other words, with reference to the illustrated embodiment, at the end destined to be connected to the bicycle steering, which is an upper end, with reference to the normal conditions of use of the damping device) by a first plug 6, while the second tubular body 3 is closed at a free end 51 thereof (opposite to the free end 50 of the first tubular body 2, in other words the end destined to be connected to the hub of the bicycle wheel, in a lower position with reference to the normal conditions of use of the damping device 1) by a second plug 7.

The damping device 1 comprises a third tubular body 8, disposed in the second chamber 5, having a radial size less than the one of the second tubular body 2, so that, at the third tubular body 8, the second chamber 5 has an annular shape. The third tubular body 8 is integral with the second tubular body 2 and the interior thereof defines a third chamber 9 fluidically communicating with the second chamber 5. Specifically, the third tubular body 8 axially extends into the second chamber 5 from the end 51 of the second tubular body 3.

The damping device 1 comprises a hollow stem 10, integral with the first tubular body 2 itself, the interior thereof defines a through chamber 11. The hollow stem 10 develops axially through the first 4 and second chambers 5, from or in proximity of the free end 50 of the first tubular body 2, until a first free end 52 thereof enters the third chamber 9. The cavity 11 of the stem 10 establishes a fluid communication between the third chamber 9 and first chamber 4. Therefore, the first chamber 4, second chamber 5, third chamber 9 and cavity 11 form a closed hydraulic circuit, in which a fluid, such as for example oil, can flow.

Suitable valves are provided for enabling said fluid to flow according to predetermined directions and also for enabling the damping device 1 to ensure an adjustable damping action. Some of these valves are not adjustable (these valves are called "static" valves), while the other valves are adjustable (these valves are called "dynamic valves").

Particularly, the damping device 1 comprises a first static valve 12 operatively disposed between the second chamber 5 and third chamber 9. The first static valve 12 can be for example positioned in the third chamber 9, integral with the third tubular body 8, in proximity of the free end 51 of the second tubular body 3. Passage openings 13 establishing a fluid communication between the third chamber 9 and second chamber 5 are advantageously formed in the third tubular body 8.

Moreover, the damping device 1 comprises a second static valve 14 integrally connected to the hollow stem 10, preferably to the free end 52 thereof, and therefore disposed inside the third chamber 9. The second static valve 14 is operatively disposed between the third chamber 9 and cavity 11 of the stem 10.

Moreover, the damping device 1 comprises a dynamic adjustable valve 15, integral with the first tubular body 2, and disposed inside the first chamber 4. The dynamic valve 15 is operatively disposed between the cavity 11 of the stem 10 and the first chamber 4 and has the function of adjusting the fluid flow between them.

Figure 4:
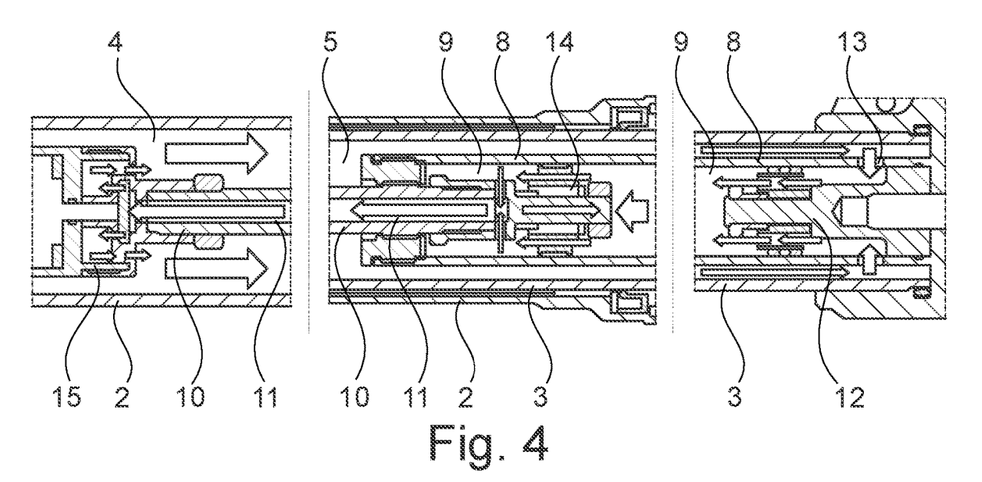
FIG. 4 is a longitudinal cross-section view of details of the damping device of FIG. 3.

The directions of the flow of a fluid, particularly oil, during the operation of the damping device 1, will be described with reference to FIGS. 3 and 4.

When the damping device 1 is compressed, the second tubular body 3 is prone to advance with respect to the first tubular body 2, inside the first chamber 4, and consequently the hollow stem 10 is prone to advance inside the third chamber 9. In such conditions, the fluid contained in the third chamber 9 flows through the second static valve 14, the cavity 11 of the hollow stem 10 until it enters the dynamic valve 15. From here, the fluid exits into the first chamber 4, continues to flow in the second chamber 5 and enters the first static valve 12, then it enters again the third chamber 9. On the contrary, when the damping device 1 extends, the second tubular body 3 is prone to exit the first chamber 4 with respect to the first tubular body 2, and the fluid flows have a direction opposite to the above described one. The passages in the first 12 and second static valves 14, and also in the dynamic valve 15, generate flow resistances which are the main cause of the damping action provided by the damping device 1.

Figure 5A:
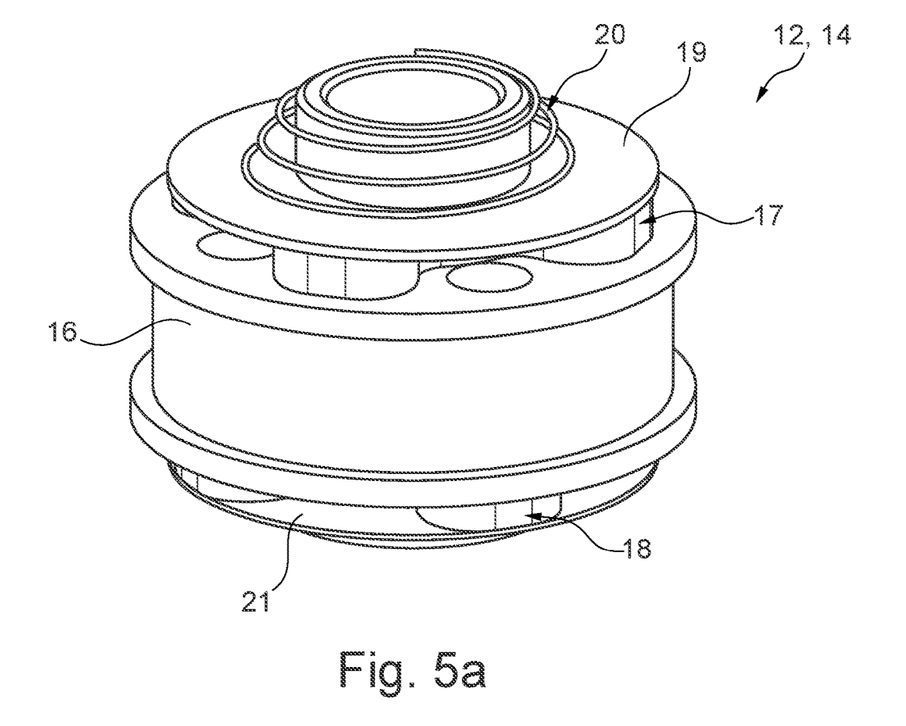
FIG. 5a is a perspective view of the damping device according to an embodiment of the invention.
Figure 5B:
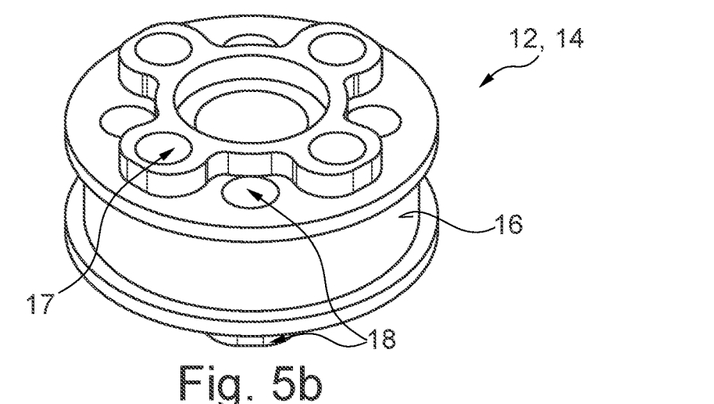
Figure 5C:
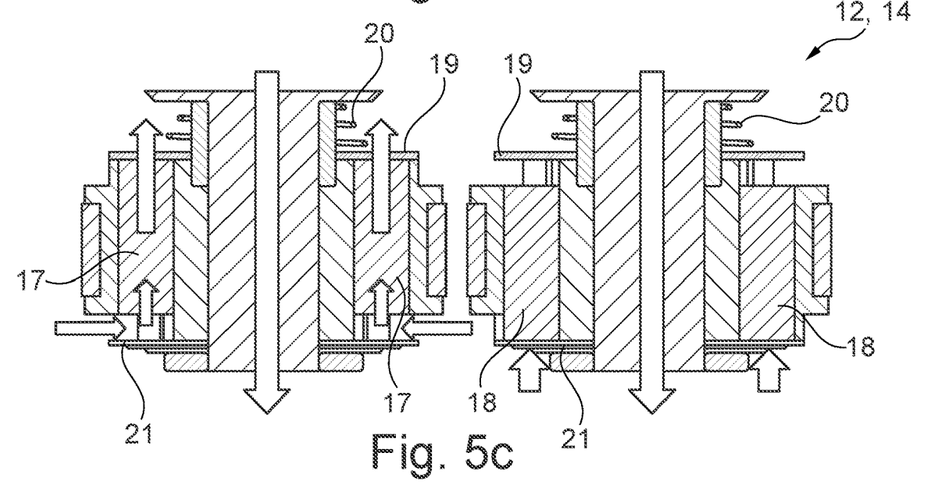
FIG. 5c shows two cross-section views, according to two different planes respectively crossing a pair of first conduits 17, and a pair of second conduits 18, of the static valve in FIG. 5a in a first operative condition.
Figure 5D:
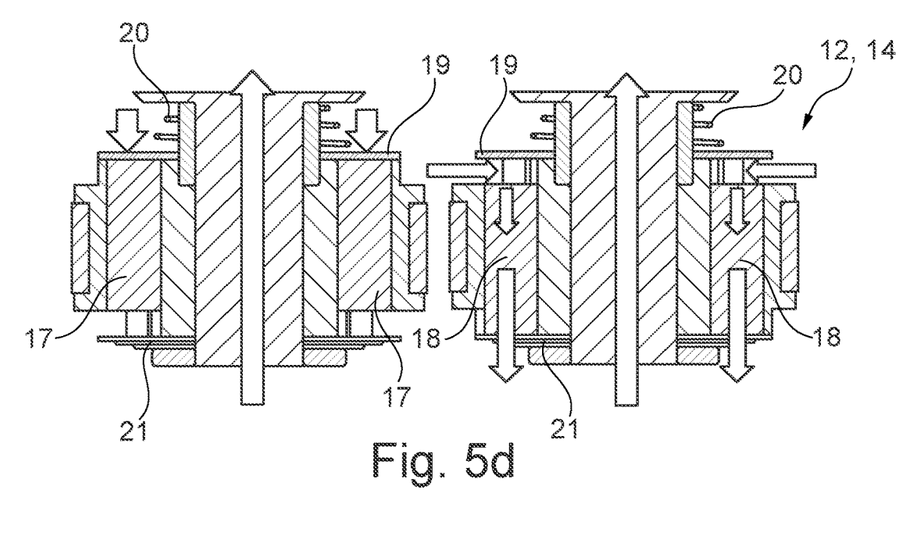
FIG. 5d shows two cross-section views, according to the same two planes of FIG. 5b, of the static valve of FIG. 5a in a second operative condition.

The first 12 and second static valves 14 are preferably identical to each other. Both are positioned in the third chamber 9 and therefore can have the same radial size. With reference to FIGS. 5a and 5b, a possible arrangement thereof will be now described. The static valves 12 and 14 comprise a valve body 16 comprising a first group of conduits 17 and a second group of conduits 18. In addition, the valve comprises a plate 19 adapted to close, on a side of the valve body 16, the conduits of the first group of conduits 17, but not the conduits of the second group of conduits 19 are not closed. Elastic means, for example a spring 20, bias the plate 19 to a closed position of the conduits of the first group of conduits 17. Moreover, the valve comprises a laminated assembly 21 closing, on the side opposite to the valve body 16 with respect to the side where the plate 19 is disposed, the conduits of the second group of conduits 18, but does not close the conduits of the first group of conduits 17. On the side of the plate 19, the conduits of the first group of conduits 17 are axially protruding so that the plate 19 abuts against them, for closing them, leaving at the same time open the conduits of the second group of conduits 18. Analogously, on the opposite side, the conduits of the second group of conduits 18 are axially protruding, so that the laminated assembly 21 abuts against them, in order to close them, while leaving open the conduits of the first group of conduits 17. Consequently, the spring 20-plate 19 system forms a non-return valve for the conduits of the first group of conduits 17, while the laminated assembly 21 implements a non-return valve for the conduits of the second group of conduits 18. Indeed, with reference to the orientation of the valve in FIG. 5, when the fluid flows from the bottom to the top, the laminated assembly 21 is held pressed against the conduits of the second group of conduits 18 (which therefore remain closed so that the fluid cannot flow through them), while the conduits of the first group of conduits 16 are open so that the fluid can flow through them, which, once it reaches the plate 19, overcomes the elastic force of the spring 20, raising the plate 19 and enabling therefore the fluid flow. Such operative condition is specifically shown in FIG. 5c. Viceversa, when the fluid flows from the top to the bottom, the plate 19 is held pressed against the conduits of the first group of conduits 17 (which therefore remain closed so that the fluid does not flow through them), while the conduits of the second group of conduits 18 are open so that the fluid can flow through them, which, once it reaches the laminated assembly 21, bends the sheets of this latter, and consequently opens the conduits of the second group of conduits 18. Such operative condition is shown in FIG. 5d. In both cases, the plate 19 and laminated assembly 21 generate, in the fluid, flow resistances which cooperate to dampen the damping device 1.

Figure 6:
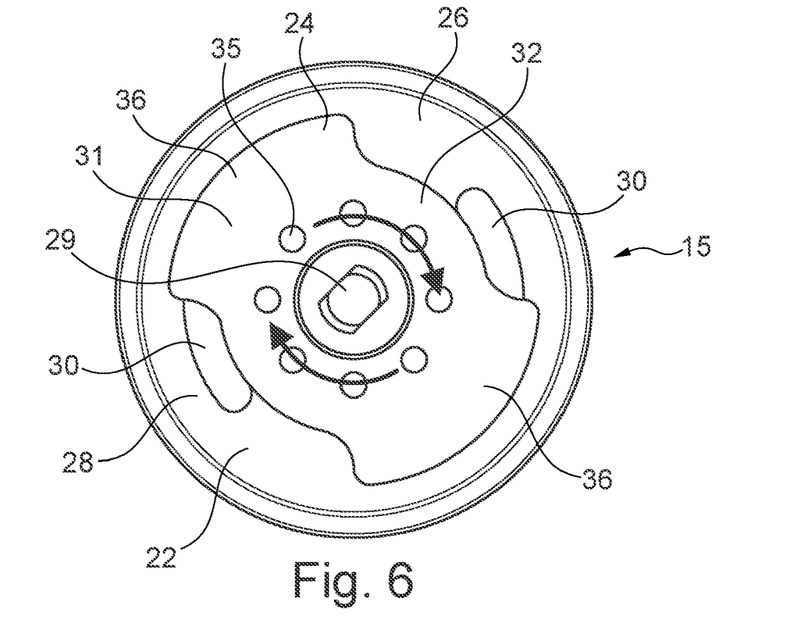
FIG. 6 is a plan cross-section view of a dynamic valve of the damping device according to an embodiment of the invention.
Figure 7:
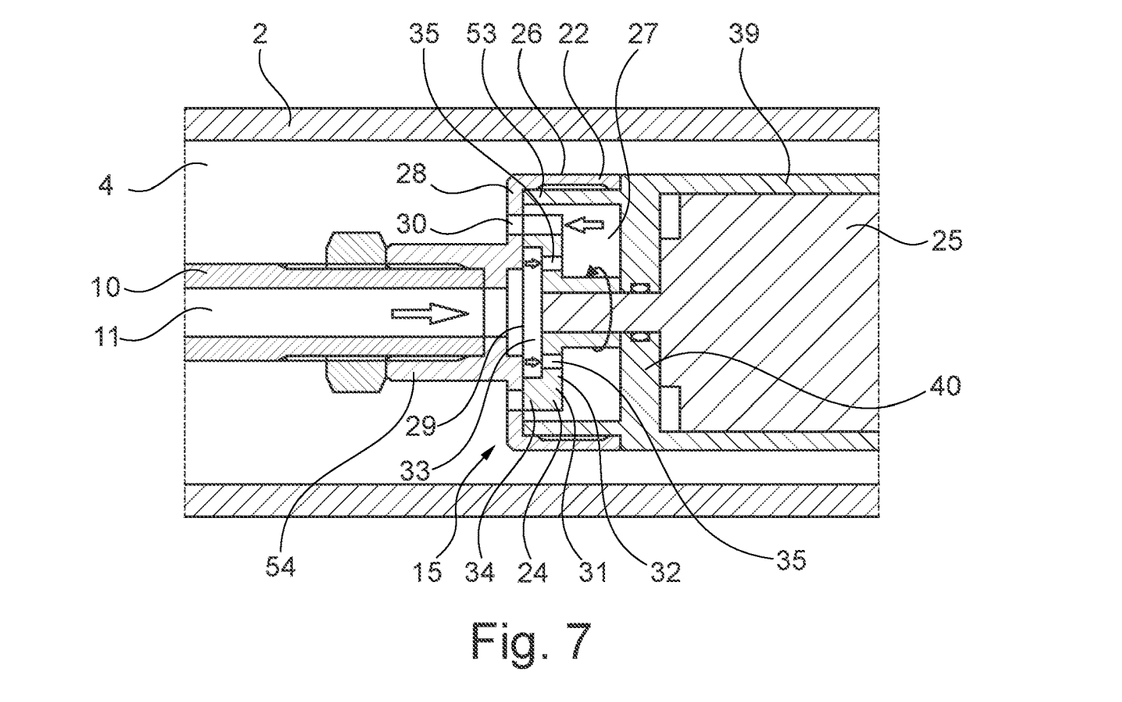
FIG. 7 is a longitudinal cross-section view of a detail of the damping device of FIG. 3.

With reference to FIGS. 6 and 7, the dynamic valve 15 according to a possible embodiment will now be described.

The dynamic valve 15 comprises a stationary body 22 having one or more openings for enabling the flow of the fluid, and a shutter 24 movable with respect to the stationary body 22 in order to change the free cross-section of the openings. Specifically, the shutter 24 can leave completely open the openings, completely closed or partially open. The shutter 24 is moved by a rotative actuator 25, e.g. a DC motor.

According to an embodiment, the stationary body 22 comprises a preferably cylindrical hollow body 26, the interior thereof defines a fluid recirculation chamber 27. In addition, the stationary body 22 comprises one or more first openings for the inlet/outlet of the fluid and one or more second outlets for the outlet/inlet of the fluid.

For example, the hollow body 26 comprises a bottom wall 28 in which a preferably central first opening 29 is formed, and a plurality of second openings 30, preferably circumferentially disposed around the first central opening 29.

Advantageously, the shutter 24 comprises a plate 31 preferably disposed at the bottom wall 28 of the hollow body 26, and rotatable around an axis perpendicular to the same (which preferably coincides with the longitudinal development axis of the hollow body 26). More advantageously, the plate 31 comprises a raised portion 32 disposed at the first central opening 29 of the bottom wall 28 of the hollow body 26, in order to define, with this latter, an auxiliary chamber 33. Such auxiliary chamber 33 is laterally defined, for example, by a peripheral wall 34 axially protruding from the raised portion 32 towards the bottom wall 28 of the hollow body 26.

The raised portion 32 of the plate 31 preferably comprises a plurality of passage openings 35 establishing a fluid communication between the auxiliary chamber 33 and recirculation chamber 27.

The plate 31, particularly the peripheral wall 34 thereof, is shaped in order to selectively close the second openings 30 of the bottom wall 28 of the stationary body 22, due to the rotations thereof. For example, the second openings 30 can comprise a pair of opposite openings, having an elongated shape and developing along a circumferential direction, and the peripheral wall 34 of the plate 19 can comprise a pair of occluding portions 36 having an analogous shape, in other words opposite to each other, with an elongated shape and having a circumferential development, and a radial thickness greater or equal to the width in a radial direction of the second openings 30. For example, with reference to FIG. 6, the peripheral wall 34 of the plate 19 can have a shape with two portions having a radius less than or equal to the internal radius of the second openings 30 and a portion, corresponding to the occluding portion 36, having a radius greater than the external radius of the second openings 30.

The plate 31 can comprise an axially protruding portion 37, towards a direction opposite to the axial development direction of the occluding portions 36, to be connected to a shaft 38 of the rotative actuator 25, with which it is provided a shape coupling.

According to an embodiment, in order to house the actuator 25, the first tubular body 2 comprises a housing 39, which can be for example connected to or made in one piece with the first plug 6. The housing 39 is disposed in the first chamber 4 in proximity of the free end 50 and comprises a bottom wall 40 which is crossed by the shaft 38 of the actuator 25. According to an embodiment, the bottom wall 40 of the housing 39 is disposed in a position opposite to the bottom wall 28 of the stationary body 22 and defines with this latter the recirculation chamber 27. For example, the hollow body 26 of the dynamic valve 15 can be screwed to the housing 39 on a threaded portion 53 axially protruding from this latter. Preferably, the hollow body 29 of the dynamic valve 15, in turn, comprises a threaded axially protruding portion 54 for stably connecting the dynamic valve 15 to the stem 10 which, in turn, has a threaded portion for making possible such connection.

This suitably shaped dynamic valve 15 is advantageously fluidically connected, on one side, to the cavity 11 of the stem 10, and to the other side, to the first chamber 4. Specifically, the first chamber 29 of the bottom wall 28 is fluidically connected to the cavity 11 of the stem 10, while the second openings 30 are fluidically connected to the first chamber 4. In this way, when the damping device 1 is compressed, the fluid flows from the cavity 11 of the stem 10 to the auxiliary chamber 33 of the dynamic valve 15 and from this latter to the first chamber 4 of the first tubular body 2, flowing through the second openings 30. When the damping device 1 extends, the fluid follows the opposite path. In both cases, the plate 31, commanded by the actuator 25, acts on the cross-section of the second openings 30 which affects the flow resistances of the fluid and consequently the damping action exerted by the damping device 1.

The actuator 25 can be commanded by a control unit. Particularly, the motion of the actuator 25 can be commanded by manual instructions of an user, for example by an user-interface device, or automatically, for example, based on signals from sensors of different types, associated to the bicycle provided with the damping device according to the invention.

From the above given description, a person skilled in the art could appreciate as the damping device, according to the invention, provided with a dynamic valve having the described features, particularly actuated by a rotative actuator, overcomes the problems cited with reference to the solenoid valves. Indeed, the dynamic valve can be adapted to the actual size of the device, particularly of the first tubular body, so that it is not necessary to oversize this latter just for receiving the dynamic valve itself.

A person skilled in the art in order to satisfy particular contingent needs can introduce several additions, modifications, or substitutions of the elements with other operatively equivalent ones, to the described embodiments of the damping device according to the invention, without falling out of the scope of the attached claims.

The invention claimed is:

1. Damping device (1) for a suspension (100) of a bicycle, comprising:
    a first tubular body (2), the interior thereof defining a first chamber (4);
    a second tubular body (3) axially slidable with respect to the first tubular body (2), the interior thereof defining a second chamber (5) fluidically communicating with the first chamber (4);
    a third tubular body (8) disposed inside the second chamber (5) and integral with the second tubular body (3), the interior thereof defining a third chamber (9) fluidically communicating with the second chamber (5);
    a hollow stem (10) integral with the first tubular body (2), wherein the interior thereof defines a through cavity (11) which establishes a fluid communication between the third chamber (9) and the first chamber (4);
    a first static valve (12) operatively disposed between the second chamber (5) and the third chamber (9);
    a second static valve (14), integrally connected to the stem (10), operatively disposed between the third chamber (9) and the cavity (11) of the stem (10);
    a dynamic valve (15) connected to the first tubular body (2) inside the first chamber (4), operatively disposed between the cavity (11) of the stem (10) and the first chamber (4),
    wherein the dynamic valve (15) comprises a stationary body (22) having one or more openings for the passage of a fluid, and a shutter (24) movable with respect to the stationary body (22) in order to modify the free cross-section of said one or more openings, the shutter (24) being constructed and arranged to be moved by a rotative actuator (25), said rotative actuator (25) comprising a DC motor, wherein the damping device (1) further comprises a control unit for commanding the rotative actuator (25),
    wherein the stationary body (22) comprises a hollow body (26), the interior thereof delimiting a fluid recirculation chamber (27), and which further comprises one or more first fluid inlet/outlet openings and one or more second fluid outlet/inlet openings,
    wherein the hollow body (26) comprises a bottom wall (28) with a first central opening (29) and a plurality of second openings (30) circumferentially disposed around the first central opening (29), wherein the first opening (29) of the bottom wall (28) is fluidically communicating with the cavity (11) of the stem (10) and the second openings (30) of the bottom wall (28) are fluidically communicating with the first chamber (4), and
    wherein the shutter (24) comprises a plate (31) disposed at the bottom wall (28) of the hollow body (26) and comprising a raised portion (32) disposed at the first central opening (29) of the bottom wall (28) of the hollow body (26), in order to delimit, together with the bottom wall (28) of the hollow body (26), an auxiliary chamber (33), wherein the plate (31) is shaped in order to selectively occlude the second openings (30) of the bottom wall (28) of the stationary body (22) due to the rotations thereof.

2. Damping device (1) according to claim 1, wherein the raised portion (32) of the plate (31) comprises a plurality of through openings (35) forming a fluid communication between the auxiliary chamber (33) and recirculation chamber (27).

3. Damping device (1) according to claim 1, wherein the plate (31) comprises an axially protruding portion (37) for the connection to a shaft (38) of the rotative actuator (25).

4. Damping device (1) according to claim 3, wherein said housing (39) comprises a bottom wall (40) through which the shaft (38) of the rotative actuator (25) passes, wherein the bottom wall (40) of the housing (30) delimits with the bottom wall (28) of the hollow body (26), the recirculation chamber (27) of the dynamic valve (15).

5. Damping device (1) according to claim 1, wherein the first tubular body (2) comprises a housing (39) for receiving said rotative actuator (25), said housing (39) being disposed at the first chamber (4).

6. Damping device (1) according to claim 5, wherein said dynamic valve (15) is integrally connected to said housing (39).

7. Damping device according to claim 1, wherein said first chamber (3) and said second chamber (5) are a continuation of each other, in order to form together a single chamber.

8. Suspension (100) for a bicycle comprising:
    a damping device (1) comprising:
        a first tubular body (2), the interior thereof defining a first chamber (4);
        a second tubular body (3) axially slidable with respect to the first tubular body (2), the interior thereof defining a second chamber (5) fluidically communicating with the first chamber (4);
        a third tubular body (8) disposed inside the second chamber (5) and integral with the second tubular body (3), the interior thereof defining a third chamber (9) fluidically communicating with the second chamber (5);
        a hollow stem (10) integral with the first tubular body (2), wherein the interior thereof defines a through cavity (11) which establishes a fluid communication between the third chamber (9) and the first chamber (4);
        a first static valve (12) operatively disposed between the second chamber (5) and the third chamber (9);
        a second static valve (14), integrally connected to the stem (10), operatively disposed between the third chamber (9) and the cavity (11) of the stem (10);
        a dynamic valve (15) connected to the first tubular body (2) inside the first chamber (4), operatively disposed between the cavity (11) of the stem (10) and the first chamber (4),
    wherein the dynamic valve (15) comprises a stationary body (22) having one or more openings for the passage of a fluid, and a shutter (24) movable with respect to the stationary body (22) in order to modify the free cross-section of said one or more openings, the shutter (24) being constructed and arranged to be moved by a rotative actuator (25), said rotative actuator (25) comprising a DC motor, and
    wherein the damping device (1) further comprises a control unit for commanding the rotative actuator (25),
    wherein the stationary body (22) comprises a hollow body (26), the interior thereof delimiting a fluid recirculation chamber (27), and which further comprises one or more first fluid inlet/outlet openings and one or more second fluid outlet/inlet openings,
    wherein the hollow body (26) comprises a bottom wall (28) with a first central opening (29) and a plurality of second openings (30) circumferentially disposed around the first central opening (29), wherein the first opening (29) of the bottom wall (28) is fluidically communicating with the cavity (11) of the stem (10)

and the second openings (30) of the bottom wall (28) are fluidically communicating with the first chamber (4), and wherein the shutter (24) comprises a plate (31) disposed at the bottom wall (28) of the hollow body (26) and comprising a raised portion (32) disposed at the first central opening (29) of the bottom wall (28) of the hollow body (26), in order to delimit, together with the bottom wall (28) of the hollow body (26), an auxiliary chamber (33), wherein the plate (31) is shaped in order to selectively occlude the second openings (30) of the bottom wall (28) of the stationary body (22) due to the rotations thereof.

* * * * *